Patented Feb. 5, 1929.

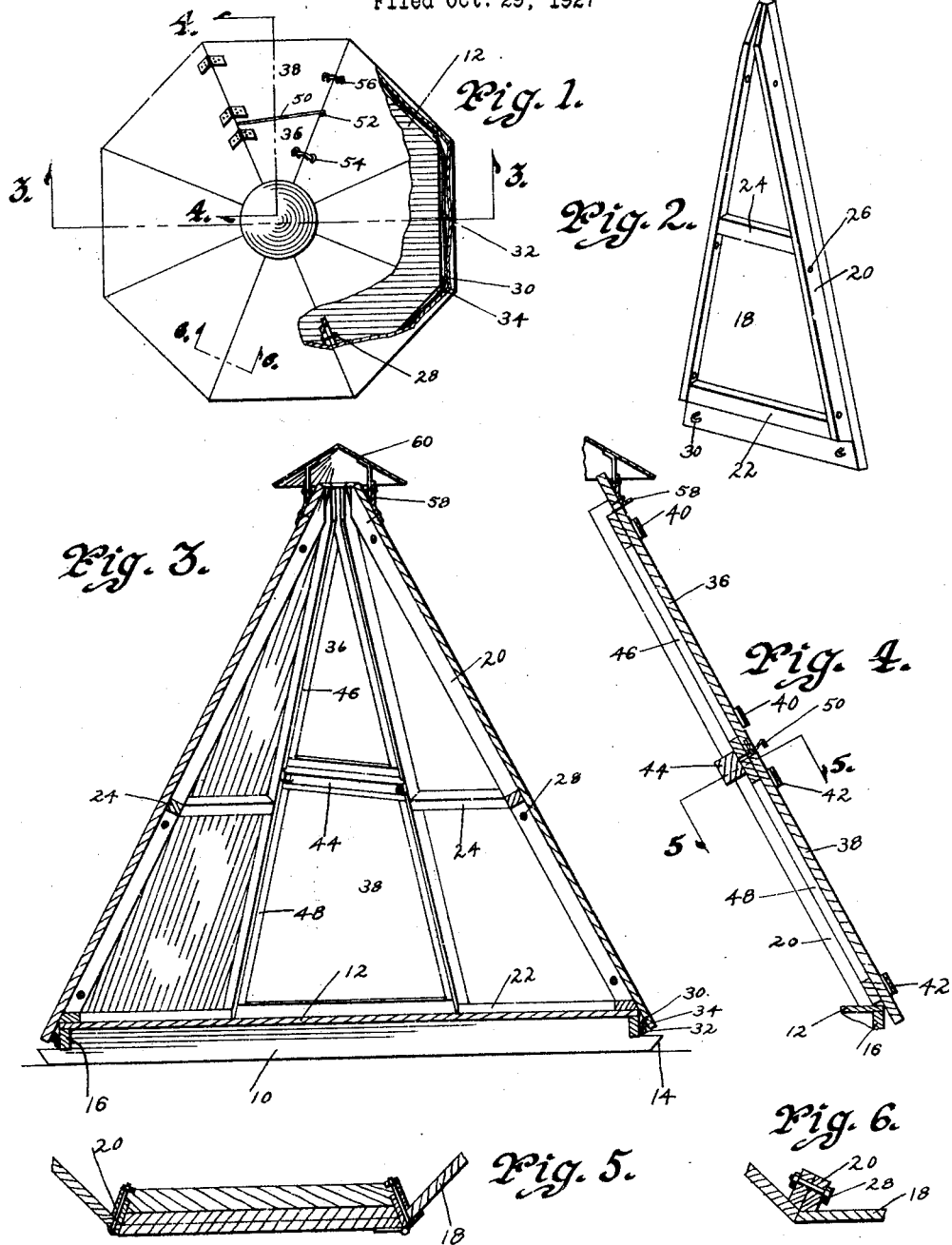

1,701,337

UNITED STATES PATENT OFFICE.

HENRY PRANGE, OF PLEASANTVILLE, IOWA.

HOG HOUSE.

Application filed October 29, 1927. Serial No. 229,611.

The object of my invention is to provide a hog house of simple, durable, and comparatively inexpensive construction.

Still a further object is to provide a hog house of the character herein disclosed especially adapted for the purpose of housing a sow and a litter of pigs, the hog house being so constructed that they is little danger of the sow's lying down on the pigs and killing them.

Still a further object is to provide in such a structure a floor member and a plurality of side members which may be separated and shipped in very condensed form and which are readily assembled to form the hog house when the parts have been taken to the place at which the hog house is to be erected.

Still a further object is to provide one of the side members hinged to another of the side members and made in two parts so that a door is provided in the house, the upper or lower part of which may be opened independent of the other part.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings forming a part of this specification and throughout the views of which like reference characters refer to the same parts.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Figure 1 is a plan view of my improved hog house structure, parts being broken away and shown in section to illustrate some of the constructional details thereof.

Figure 2 is a perspective view of one of the side wall members of my device.

Figure 3 is a vertical sectional view through the hog house taken on the line 3—3 of Figure 1.

Figure 4 is a sectional view through the door portion of my house as taken on the line 4—4 of Figure 1.

Figure 5 is a sectional view taken on the line 5—5 of Figure 4; and

Figure 6 is an enlarged detail view taken on the line 6—6 of Figure 1.

In the embodiment of my invention which I have illustrated on the patent drawing hereto annexed, I have used the reference numeral 10 to indicate skids or floor braces upon which a floor 12 is secured. The skids 10 are beveled at each end as indicated at 14 so that the hog house may be moved from one position to another by merely pulling it across the ground with the aid of a team of horses. A peripheral side bar 16 extends around the floor and serves to additionally support the floor boards 12. As clearly shown in Figure 1 the floor 12 is polygonal in shape.

I have made my hog house in the form of a pyramid with the side walls slanting upwardly and inwardly so that a sow in the house cannot get close to the wall adjacent the floor. This leaves considerable room for the small pigs so that when the sow lies down, there is plenty of room for them to get out of her way. In order to make my structure in the form of a pyramid I provide a plurality of side members 18 substantially triangular in shape. The side members 18 are provided with side bars 20 secured at their edges, a bottom bar 22 and a brace 24 substantially half way between the top and the bottom of the side member 18. The side bars 20 are provided with openings 26 adapted to receive bolts 28 when the house is assembled. In Figure 6 I have illustrated the manner of connecting adjacent side bars 20 together for the purpose of assembling the house.

The bottom bar 22 of each side member 18 rests on the floor 12 as clearly illustrated in Figure 3. Adjacent the lower corners of each side member 18 I have inserted staples or eyes 30. At substantially the center of each side of the polygonal shaped floor 12 I also secure a staple or eye 32. After the side members 18 are assembled on the floor 12 a wire 34 is extended around the floor 12 and is threaded through the staples 30 and 32. This construction serves to connect the side members 18 to the floor member 12.

In the house which I have illustrated, I have used seven side members 18 leaving one side open for the purpose of forming a door opening. This door opening is closed by a door comprising an upper door section 36 and a lower door section 38. The door sections 36 and 38 are hingedly secured to one of the side members 18 by hinges 40 and 42. For bracing the door opening covered by the doors 36 and 38 I provide a bar 44 bolted to the side bars 20 of the side members 18 on each side of the door opening. The brace 44 may be removed if desired. The brace 44 forms a stop bar for the lower edge of the upper door section 36 and for the upper edge of the lower door section 38.

The door section 36 is provided with a peripheral reinforcing bar 46 and the door 38 is provided with a similar bar 48. It will be noted where the two adjacent edges of the doors 36 and 38 overlap the brace 44 they are slanted and the brace 44 is likewise slanted. A sheet metal trough 50 is secured to the lower edge of the upper door 36 and extends beyond the free edges of the doors as indicated at 52. The purpose of the trough 50 is to receive water running down the upper door 36 and conduct it away from the door so that this water will not run through the crack between the upper and lower doors. Suitable latch devices 54 and 56 may be provided for the doors 36 and 38.

I provide a ventilator device for my structure consisting of a polygonal shaped tube 58 which may be forced down over the top of the side members 18 and then nailed in position. A cone shaped deflector cap 60 is secured above the tube 58 and spaced therefrom. The side members 18 are cut off at their upper ends instead of extending to a point so that an opening is left for ventilation.

Some changes may be made in the construction of my device without departing from the real spirit and purpose of my invention and it is my intention to cover by my claims, any modified forms of structure or use of mechanical equivalents, which may be reasonably included within their scope.

I claim as my invention:

1. In a hog house of the character described, a polygonal floor member, triangular side members for each side of the floor member whereby the side members when assembled form an upwardly and inwardly slanting wall for the hog house and means for securing the side members to the floor member, said means comprising staples on the bottom of the side members and around the floor member and a wire extending through said staples.

2. A hog house comprising a floor member, a plurality of side members converging to a point at the top of the house, one of said side members being hinged to another one for forming a door for the house, said door being formed of two door sections, a bar across the door opening at the meeting edges of said door sections and a water trough between said sections and secured to the upper one to catch the water running from said upper section and prevent its entrance to the inside of the hog house through the space between said sections.

HENRY PRANGE.